United States Patent
Haramaty et al.

(10) Patent No.: US 8,416,805 B2
(45) Date of Patent: Apr. 9, 2013

(54) REPORTING MECHANISM FOR EFFICIENT UPSTREAM BANDWIDTH UTILIZATION IN A 10G EPON

(75) Inventors: Zachy Haramaty, Ramat Gan (IL); Jeff Mandin, Jerusalem (IL); Valentin Ossman, Netanya (IL)

(73) Assignee: PMC Sierra Ltd, Herzeliya Pituach (IL)

( * ) Notice: Subject to any disclaimer, the term of this patent is extended or adjusted under 35 U.S.C. 154(b) by 613 days.

(21) Appl. No.: 12/472,477

(22) Filed: May 27, 2009

(65) Prior Publication Data
US 2010/0303093 A1    Dec. 2, 2010

(51) Int. Cl.
H04J 3/14    (2006.01)
(52) U.S. Cl.
USPC .......................................... 370/468; 370/477
(58) Field of Classification Search .................. None
See application file for complete search history.

(56) References Cited

U.S. PATENT DOCUMENTS

| | | | |
|---|---|---|---|
| 7,920,593 B2 | 4/2011 | Haran | |
| 2005/0281279 A1* | 12/2005 | Dennison et al. | 370/412 |
| 2008/0115037 A1* | 5/2008 | Effenberger | 714/758 |
| 2008/0181248 A1* | 7/2008 | Haran et al. | 370/412 |
| 2010/0021161 A1* | 1/2010 | Endo et al. | 398/45 |
| 2010/0098413 A1* | 4/2010 | Li et al. | 398/38 |
| 2010/0316387 A1* | 12/2010 | Suvakovic | 398/98 |
| 2011/0097076 A1* | 4/2011 | Geng et al. | 398/1 |

FOREIGN PATENT DOCUMENTS

| | | |
|---|---|---|
| WO | WO2004073222 | 8/2004 |
| WO | WO2008058482 | 5/2008 |

OTHER PUBLICATIONS

IEEE Standard for Information technology—Telecommunications and information exchange between systems—Local and metropolitan area networks—Specific requirements, Part 3: Carrier Sence Muliple Access With Collision Detection (CSMA/CD) Access Method and Physical Layer Specifications, IEEE STD 802.av, Oct. 30, 2009, pp. 1-214.

* cited by examiner

*Primary Examiner* — Hassan Kizou
*Assistant Examiner* — Roberta A Shand
(74) *Attorney, Agent, or Firm* — Mark M Friedman

(57) ABSTRACT

Methods for increasing upstream bandwidth utilization in an Ethernet passive optical network (EPON) use in some instances round-down instead of round-up occupancy values reported to an optical line terminal. An optical network unit determines whether the occupancy needs to be round-up or round-down and reports the occupancy in either round-up or round-down report units to the optical network terminal.

14 Claims, 3 Drawing Sheets

FIG. 1: Prior art

REPORTING MECHANISM FOR EFFICIENT UPSTREAM BANDWIDTH UTILIZATION IN A 10G EPON

FIELD OF THE INVENTION

The invention relates generally to data access methods, and more particularly, to methods for optimizing data transmission in Ethernet packet traffic over Passive Optical Network (PON) topologies.

BACKGROUND OF THE INVENTION

Modern Ethernet Passive Optical Networks (EPON) use 10 Gigabit per second (10G) Ethernet transport, which is suitable to very high-speed data applications, as well as to converged system support (telephone, video, etc.). The unprecedented amount of bandwidth is directed toward, and arriving from a single entity, the Optical Network Unit (ONU). Normative numbers for ONUs in 10G EPON are 16, 32 or 64 and up to 256.

An EPON can be viewed as a distributed switch. An Optical Line Terminal (OLT) manages remotely the transmission of each ONU. The OLT and the ONUs exchange messages. In each cycle of such an exchange, the OLT grants a grant to each ONU, which is answered by a report message from the ONU. The ONU has a queue manager that prepares queue status information, which is transmitted using MPCP messages to the OLT to enable smart management. In other words, the ONU informs the OLT on its internal queues status. The OLT management is executed using a Dynamic Bandwidth Allocation (DBA) algorithm. An efficient algorithm is essential to guarantee Quality of Service (QoS), required to fulfill a Service Level Agreement (SLA). Methods for BW management are known, see e.g. US patent application No. 20080181248 by Haran et al.

The OLT transmits in downstream at full rate. The ONUs each transmit in upstream at an aggregate full rate where the transmission is divided among the ONUs in a time-division manner. In order to do proper BW management, each ONU reports the number of bytes that it has to transmit (referred to hereinafter as a "report value" or simply "report"). The OLT grants each ONU with a grant according to its report. This report-grant procedure is well known in the art. For 10G EPON the grants axe given by forward error corrected (FEC) codeword boundaries. The report values are given in units of time quanta (TQ). In 10G EPON (IEEE 802.3av standard) the normative values are 20 Bytes for one TQ and 216 Bytes without FEC parity and 248 Bytes with FEC parity for one FEC codeword.

The 10G EPON standard specifically requires a round-up of the reports to TQ units. In order not to request too little, the ONU rounds-up its request and sends the request as a REPORT to the OLT. For example, when rounding up to units of 20 Bytes, the ONU may request one excessive FEC codeword. The OLT needs to determine how many FEC codewords are needed by the ONU, and assigns the ONU a GRANT for N×FEC codewords. Note that while reports do not account for FEC parity, grants do. Therefore the OLT assigns N×248 Bytes and then it rounds this up to units of TQs (20 Bytes). When granted to the ONU, the excess FEC codeword may be wasted if the ONU has nothing to transmit. The OLT could have assigned this FEC codeword to another ONU and thus this upstream bandwidth would not have been wasted.

The following example illustrates the problem for one queue: assume the report net value is 201 Bytes. Due to the TQ round-up, the report value becomes 220 Bytes. Since round-up (220/216)=2, the OLT will assign two FEC codewords. The net grant (without FEC parity) will be 2*216=432 Bytes. The grant will thus have an excess of 231 Bytes instead of an excess of only 15 Bytes would the grant have been for one FEC codeword.

A prior art ONU-OLT report-grant mechanism is summarized in FIG. 1. In step 100 the GNU prepares a request to transmit data according to the occupancy (in bytes) of one or more transmission queues. This request is done via transmission of a report packet which reports the occupancy of each queue in units of TQ (also referred to as "report value"). "Occupancy" of a queue is defined herein to take into account any QoS functions (such as shaping and scheduling) applied. The report is provided in units of TQ. The report value is always rounded-up to TQ units in order not to request too little. In step 102, the OLT checks the reports from all ONUs and assigns respective grants to the ONUs in units of TQs. Since the transmissions use FEC, the OLT must make each grant long enough to as to accommodate a particular number of whole FEC codeword units, where the codewords will accommodate the report values and also FEC parity.

In view of the problem of the existing ONU-OLT report-grant mechanism in terms of wasted bandwidth, there is a need for, and it would be advantageous to have, an improved reporting mechanism for efficient upstream bandwidth utilization in 10G EPON.

BRIEF DESCRIPTION OF THE DRAWINGS

The invention is herein described, by way of example only, with reference to the accompanying drawings, wherein.

SUMMARY OF THE INVENTION

Figure 1:
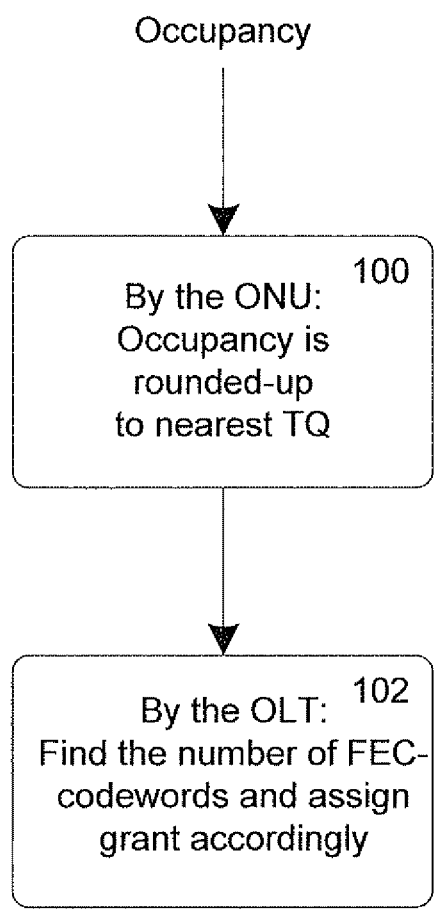
FIG. 1 shows a prior art report-grant mechanism in EPON.

The invention provides an improved reporting mechanism for efficient upstream bandwidth utilization in 10G EPON, expressed in a method for increasing upstream bandwidth utilization based on round-down of reports. "Round-down" herein refers to an action opposite to "round-up". A report round-down instead of round-up is counter intuitive. However, the invention shows that this counter intuitive idea works and achieves more efficient upstream bandwidth utilization in 10G EPON.

In one embodiment, the method uses reporting based on a comparison to 10G-EPON RS(255,223) FEC codewords. For example, since the report must be given to the OLT in units of TQs, a queue occupancy of 210 Bytes will be reported as 10 TQ (rounding down to the nearest TQ) instead of 11 TQ (by rounding up to the nearest TQ), with the result that the OLT allocates exactly one FEC codeword (with 216 bytes of data payload), as needed. Without use of the method, a report of 11 TQ (corresponding to 220 bytes) would result in an allocation of 2 FEC codewords, leading to wasted bandwidth.

According to the invention there is provided a method for increasing upstream bandwidth utilization in an EPON, including the steps of: by an ONU having queues with occupancy levels, determining whether a queue occupancy needs to be round-up or can be round-down, and based on the results of the determination, reporting the queue occupancy in either a rounded-up or rounded-down report value to an OLT of the EPON.

In an embodiment, the step of determining includes rounding-down the queue's occupancy level (in bytes) to the nearest TQ units to obtain a first report value and calculating the number of FEC codeword units in order to obtain a first FEC codeword value, then rounding-up the queue's occupancy level (in bytes) to the nearest FEC codeword units to obtain a second FEC codeword value, and comparing the first FEC codeword value with the second FEC codeword value to determine whether the occupancy needs to be rounded-up or can be rounded-down. If the comparison indicates that the second FEC codeword value is smaller than or equal to the first FEC codeword value, the first report value is reported to the OLT. If the comparison indicates that the second FEC codeword value is larger than the first FEC codeword value, the occupancy is rounded-up to the nearest TQ units to obtain a second report value, and the second report value is reported to the OLT.

According to the invention there is provided a method for increasing upstream bandwidth utilization in an EPON, including the steps of: by an ONU having an occupancy: checking if the occupancy can be round-down, and if yes, rounding-down the occupancy to the nearest TQ units to obtain a round-down report value, and reporting the round-down report value to the nearest TQ units to an optical network terminal OLT of the EPON.

According to the invention there is provided a method for increasing upstream bandwidth utilization in an EPON, including the steps of: by an ONU having an occupancy: checking if the occupancy can be round-down, and if yes, rounding-down the occupancy to the nearest TQ units to obtain a round-down report value, checking if the round-down report value is smaller than five TQs and if yes, rounding-up the occupancy to the nearest TQ units to obtain a round-up report value, and reporting the round-up report value to an OLT of the EPON.

In some embodiments of the methods, the EPON is a 10 EPON.

In some embodiments in which there is a plurality of different queues with different occupancies, a method of the invention further includes the step of adjusting each report value in order to compensate for other report value leftovers.

DETAILED DESCRIPTION OF THE INVENTION

Figure 2:
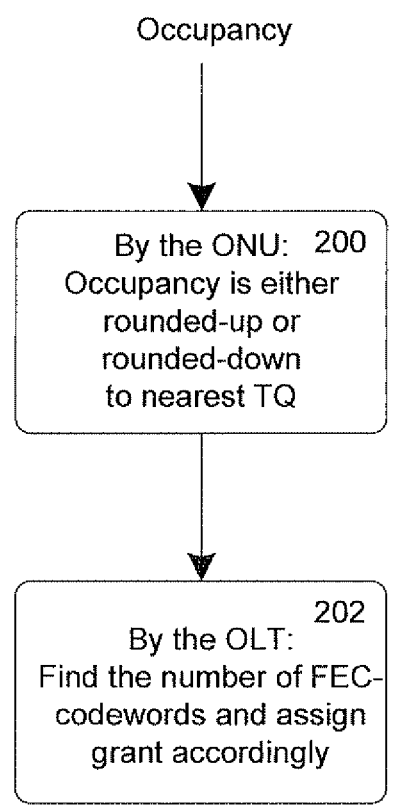
FIG. 2 shows a report-grant mechanism according to the invention.

FIG. 2 shows a report-grant mechanism according to the invention, implemented exemplarily in 10G EPON. In contrast with step 100 of FIG. 1 where the ONU always rounds-up a report in order not to request too little, in step 200, the ONU may, if advantageous, round-down the queue occupancy value to the nearest TQ value (also referred to as "a "first report value"). In step 202, the OLT handles the report in the same exact way as in step 102, i.e. it checks the reports from all ONUs and assigns respective grants to the ONUs in FEC codewords that accommodate report values.

Figure 3:
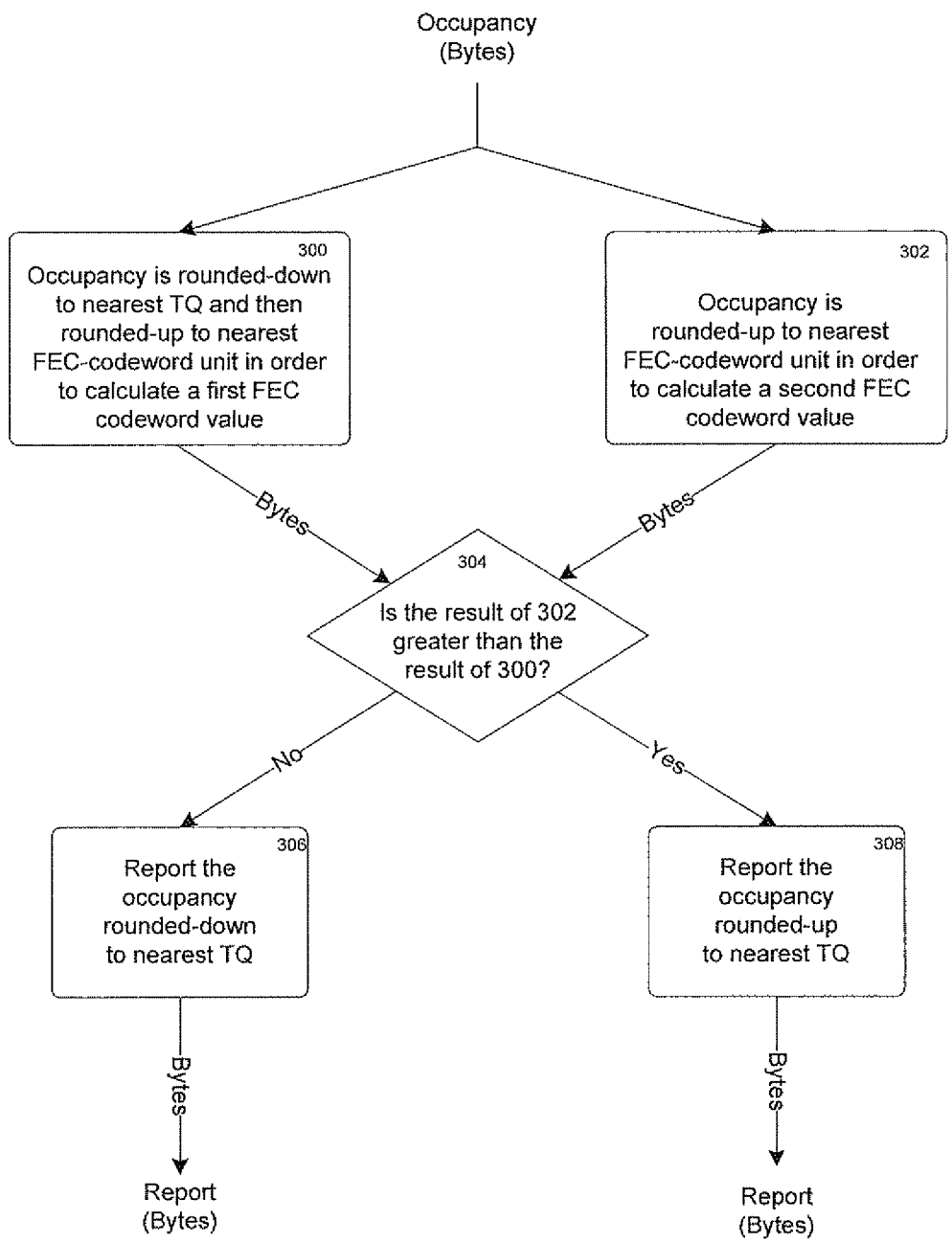
FIG. 3 shows an exchange between an ONU and an OLT in a method of the invention.

FIG. 3 shows details of step 200 in FIG. 2. In step 300, the queue occupancy is converted to TQ and rounded-down to the nearest TQ units (the first report value), and then the number of FEC codewords (or "FEC codeword value") necessary to carry a data payload of this size is calculated by rounding-up the result to the nearest FEC codeword unit. In step 302, the queue occupancy is divided by the FEC codeword payload size (and rounded-up to the nearest FEC codeword unit) in order to calculate the number of FEC codewords necessary to carry the actual data in the queue. In step 304, the results of steps 300 and 302 are compared to determine whether the second number of FEC codewords (or "FEC codeword value") in step 302 is larger than the first number of FEC codewords in step 300. If the first FEC codeword value is smaller than the second FEC codeword value, or if the first FEC codeword value is equal to the second FEC codeword value, then the first report value is sent to the OLT in step 306. Otherwise, in step 304, the occupancy is rounded-up to the nearest TQ units to obtain a second report value in step 308 and this value is reported to the OLT.

The actions in FIG. 3 may also be expressed by the following algorithm:

Input: Occupancy
Do{

$$reportVal_1 = 20 \times \left\lfloor \frac{Occupancy}{20} \right\rfloor$$

$$reportVal_2 = 20 \times \left\lceil \frac{Occupancy}{20} \right\rceil$$

$$FecCW_1 = \left\lceil \frac{reportVal_1}{216} \right\rceil \quad // \text{ step } 300$$

$$FecCW_2 = \left\lceil \frac{Occupancy}{216} \right\rceil \quad // \text{ step } 302$$

If($FecCW_2 > FecCW_1$)   // check, step 304
   Then    // round-up, step 308
             Result = $reportVal_2$
   Else    // round-down, step 306
             Result = $reportVal_1$
}

In an embodiment for 10G EPON, the minimum value for a report that supports minimum sized packets (84 Bytes transmission length) is 5 TQs (100 Bytes). In such an embodiment, an additional check needs to be done in step 304 to see if the report round-down becomes too short. If yes, the report will be round up, without affecting bandwidth.

In an embodiment for 10G EPON there are 16 IDLE bytes in the first FEC codeword in a transmission burst. These IDLE bytes need to be taken into account. They are taken into account when calculating the FEC codeword limit (step 302) and when checking if the lower TQ value satisfies the required length (step 304).

In an embodiment for 10G EPON, there may be more than one report queue (10G EPON supports up to 8). In order to apply a method of the invention, an ONU needs to interact with an OLT according to one of three "scenarios": the OLT either (1) grants according to one report queue, or (2) always grants according to the sum of all report queues so that each report queue by itself is insignificant, or (3) has a known order of strict priority granting according to the report queues (e.g. from report-queue #7 down to report-queue #0 in case of 8 report queues). Scenario (1) is fulfilled by the invention as described above. Scenarios (2) and (3) may be fulfilled according to the following algorithm:

Input: $Occupancy_i$, (i ∈ [7 . . . 0], i per report-queue)
Initial: TotOccupancy = 0
Initial: TotReport = 0
Initial: IDLEs = 16 // account for the 16 IDLE bytes
For all report queues from 7 to 0 (assign i = report queue index):
{
   If ($Occupancy_i$=0) then { $Result_i$=0, skip to next i}
   Else:
      TotOccupancy += $Occupancy_i$ -continued $$Z = \text{TotOccupancy} - \text{TotReport}$$

$$X_1 = 20 \times \left\lfloor \frac{Z}{20} \right\rfloor$$

$$X_2 = 20 \times \left\lceil \frac{Z}{20} \right\rceil$$

$$\text{TotReport}_1 = \text{TotReport} + X_1$$

$$\text{TotOccupancyFec} = \left\lceil \frac{\text{TotOccupancy} + \text{IDLEs}}{216} \right\rceil$$

$$\text{TotReportFec}_1 = \left\lceil \frac{\text{Totreport}_1 + \text{IDLEs}}{216} \right\rceil$$

```
If ( (TotOccupancyFec > TotReportFec₁) OR (X₁ ≦100))
    Then    // round-up
            Resultᵢ = X₂
    Else    // round-down
            Resultᵢ = X₁
    TotReport += Resultᵢ
}
```

The following table shows exemplary values of the different parameters following the method steps in FIG. 3

| Occupancy | Number of FEC codewords according to rounded-down occupancy (step 300) | Number of FEC codewords according to occupancy (step 302) | Is the report value of step 302 greater than that of step 300? (step 304) | Occupancy rounded-down to nearest TQ (step 306) | Occupancy rounded-up to nearest TQ (step 308) |
|---|---|---|---|---|---|
| 199 | 1 | 1 | no | 180 | 200 |
| 200 | 1 | 1 | no | 200 | 200 |
| 201 | 1 | 1 | no | 200 | 220 |
| 215 | 1 | 1 | no | 200 | 220 |
| 216 | 1 | 1 | no | 200 | 200 |
| 217 | 1 | 2 | yes | 200 | 220 |
| 219 | 1 | 2 | yes | 200 | 220 |
| 220 | 2 | 2 | no | 220 | 220 |
| 431 | 2 | 2 | no | 420 | 440 |
| 432 | 2 | 2 | no | 420 | 440 |
| 433 | 2 | 3 | yes | 420 | 440 |
| 439 | 2 | 3 | yes | 420 | 440 |
| 440 | 3 | 3 | no | 440 | 440 |

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made. Those skilled in the art will appreciate that the invention can be embodied by other forms and ways, within the scope of the invention. The embodiments described herein should be considered as illustrative and not restrictive. For example, the invention is not limited to 10G EPON, but may be applied to future versions of EPON.

The invention claimed is:

1. A method for increasing upstream bandwidth utilization in an Ethernet passive optical network (EPON), comprising the steps of: by an optical network unit (ONU) having a plurality of queues with corresponding occupancy levels:
    a) determining a report value for each of the queues based on whether a queue occupancy needs to be round-up or can be round-down, wherein the queue occupancy indicates an amount of data the ONU has for transmission in a current grant cycle;
    b) adjusting each said report value in order to compensate for other report value leftovers; and
    c) based on the results of the determination, reporting the queue occupancy in an adjusted either a rounded-up or rounded-down report value to an optical line terminal (OLT) of the EPON.

2. The method of claim 1, wherein the EPON is a 10G EPON.

3. A method for increasing upstream bandwidth utilization in an Ethernet passive optical network (EPON), comprising the steps of: by an optical network unit (ONU) having a plurality of queues with corresponding occupancy levels, wherein the occupancy level indicates an amount of data the ONU has for transmission in a current grant cycle:
    a) checking if the occupancy can be round-down to a first report value for each of the queues, and if yes;
    b) rounding-down each occupancy level to a nearest time quanta (TQ) units to obtain each first report value;
    c) adjusting each first report value in order to compensate for other first report value leftovers; and
    d) reporting each first report value to an optical line terminal (OLT) of the EPON.

4. The method of claim 3, wherein the EPON is a 10G EPON.

5. A method for increasing upstream bandwidth utilization in an Ethernet passive optical network (EPON), comprising the steps of by an optical network unit (ONU) having an occupancy:
    a) checking if the occupancy can be round-down to a first report value, and if yes;
    b) rounding-down the occupancy to the nearest time quanta (TQ) units to obtain the first report value;

c) checking if the first report value is smaller than five TQs and if yes,
d) rounding-up the occupancy to the nearest TQ units to obtain a second report value; and
e) reporting the second report value to an optical line terminal (OLT) of the EPON.

6. The method of claim 5, wherein there is a plurality of different queues with different occupancies and wherein the method further comprises the step of adjusting each report value in order to compensate for other report value leftovers.

7. The method of claim 5, wherein the EPON is a 100 EPON.

8. A method for increasing upstream bandwidth utilization in an Ethernet passive optical network (EPON), comprising the steps of: by an optical network unit (ONU) having queues with occupancy levels:
   a) determining whether a queue occupancy needs to be round-up or can be round-down by:
      i. rounding down the occupancy to nearest time quanta (TQ) units to obtain a first report value;
      ii. rounding up the first report value to nearest forward error correction (FEC) codeword units to obtain a first FEC codeword value;
      iii. rounding up the occupancy to nearest FEC codeword units to obtain a second FEC codeword value; and
      iv. comparing the first FEC codeword value with the second FEC codeword value to determine whether the occupancy needs to be round-up or round-down; and
   b) based on the results of the determination, reporting the queue occupancy in either a rounded-up or rounded-down report value to an optical line terminal (OLT) of the EPON.

9. The method of claim 8, wherein if the comparison indicates that the second FEC codeword value is smaller than or equal to the first FEC codeword report value, reporting the first report value to the OLT.

10. The method of claim 8, wherein if the comparison indicates that the second FEC codeword value is larger than the first FEC codeword value, rounding-up the occupancy to nearest TQ units to obtain a second report value and reporting the second report value to the OLT.

11. The method of claim 8, wherein there is a plurality of different queues with different occupancies and wherein the method further comprises the step of adjusting each report value in order to compensate for other report value leftovers.

12. A method for increasing upstream bandwidth utilization in an Ethernet passive optical network (EPON), comprising the steps of: by an optical network unit (ONU) having an occupancy:
   a) checking if the occupancy can be round-down to a first report value by: comparing a first FEC codeword value obtained by rounding up the first report value to a nearest forward error correction (FEC) codeword units with a second FEC codeword value obtained by rounding up an occupancy value to a nearest forward error correction (FEC) codeword units, and if said first FEC codeword value is less than said second FEC codeword value;
   b) rounding-down the occupancy to a nearest time quanta (TQ) units to obtain the first report value; and
   c) reporting the first report value to an optical line terminal (OLT) of the EPON.

13. The method of claim 12, wherein there is a plurality of different queues with different occupancies, and wherein the method further comprises the step of adjusting each report value in order to compensate for other report value leftovers.

14. The method of claim 12, wherein the EPON is a 10G EPON.

\* \* \* \* \*